Oct. 5, 1965  G. CHIEGER  3,210,110
TORSIONAL BUMPER
Filed Feb. 8, 1962  3 Sheets-Sheet 1
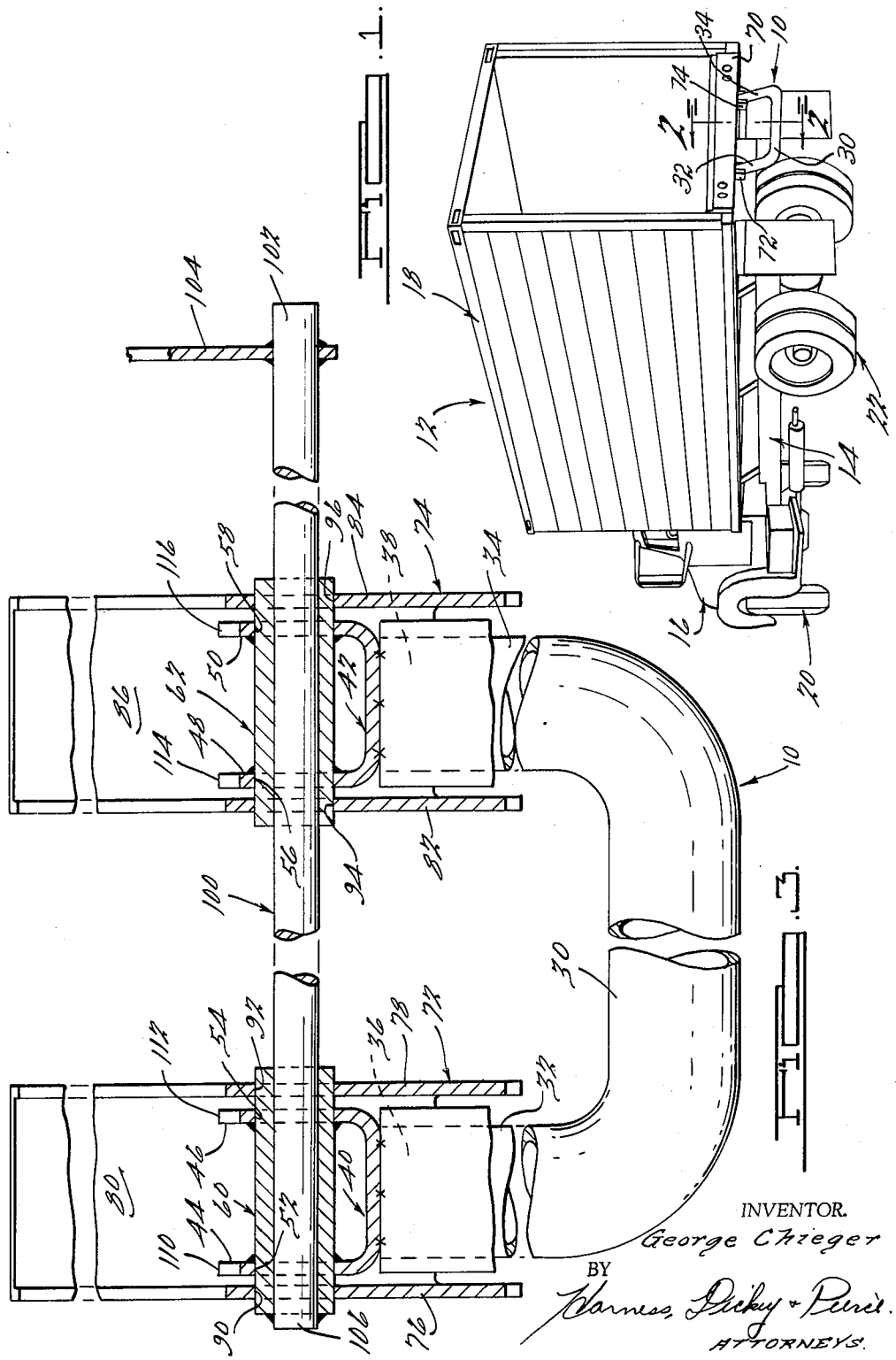
INVENTOR.
George Chieger
BY
Harness, Dickey & Pierce.
ATTORNEYS.

Oct. 5, 1965  G. CHIEGER  3,210,110
TORSIONAL BUMPER
Filed Feb. 8, 1962  3 Sheets-Sheet 2
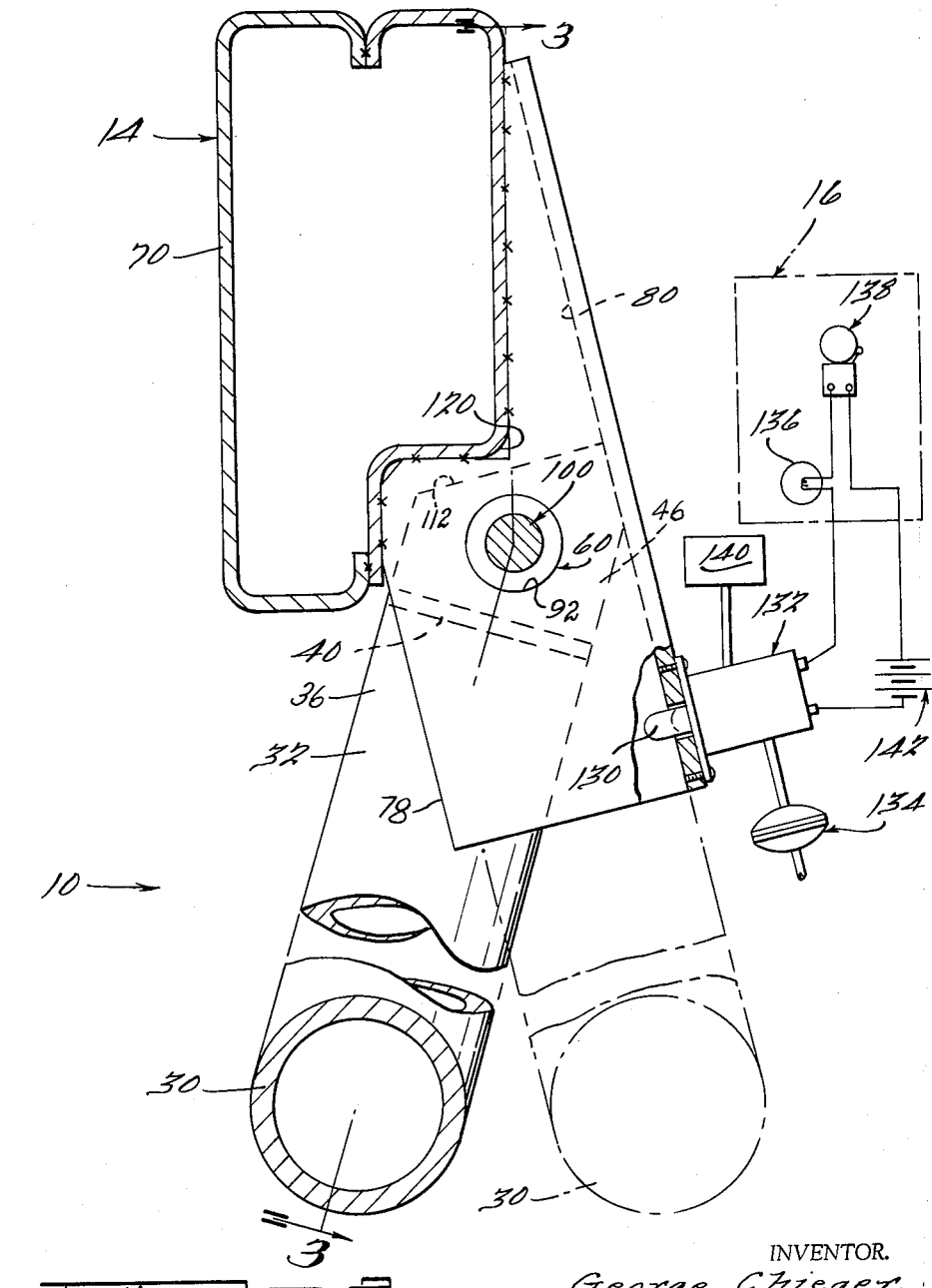
INVENTOR.
George Chieger
BY
Harness, Dickey & Pierce
ATTORNEYS

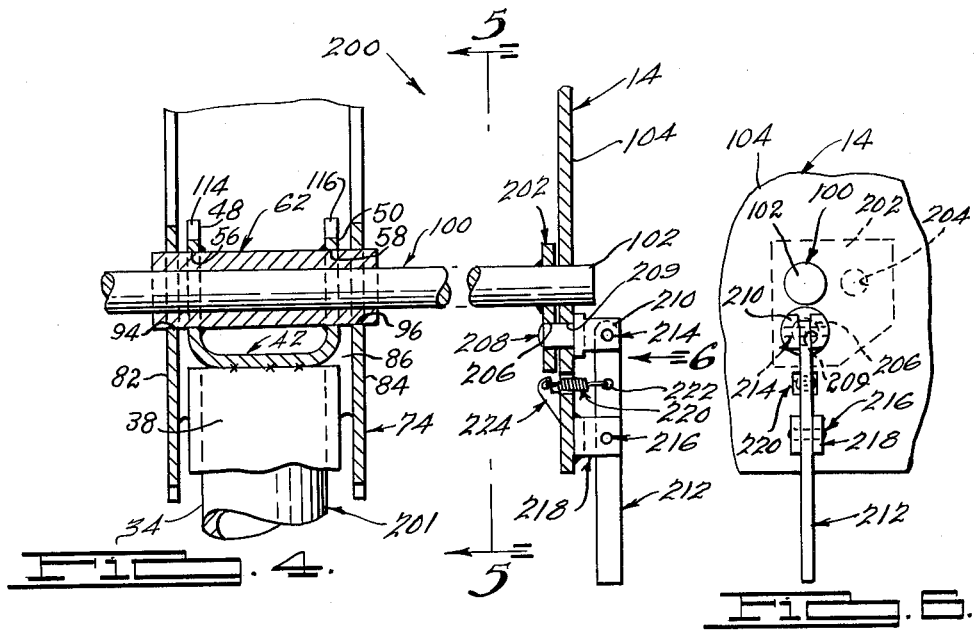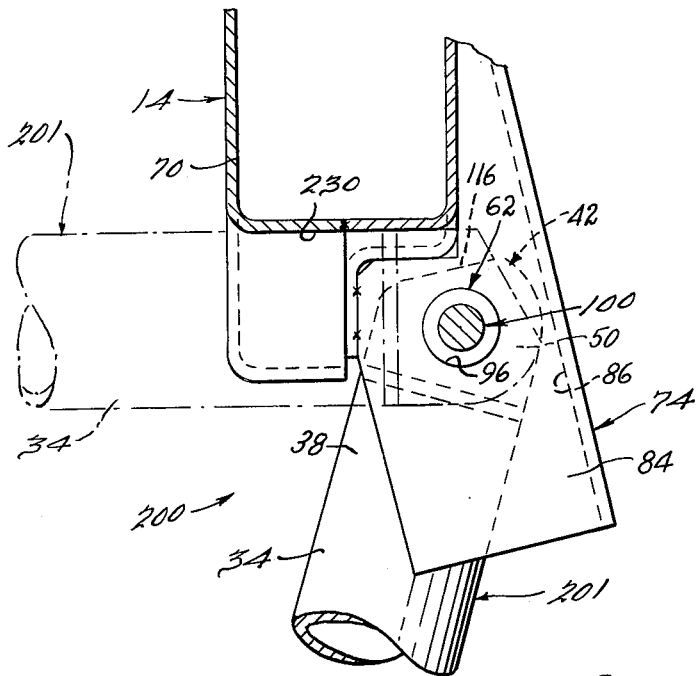

United States Patent Office 3,210,110
Patented Oct. 5, 1965

3,210,110
TORSIONAL BUMPER
George Chieger, Grosse Pointe Woods, Mich., assignor to Fruehauf Corporation, a corporation of Michigan
Filed Feb. 8, 1962, Ser. No. 172,022
2 Claims. (Cl. 293—73)

This invention relates generally to vehicle accessories and more particularly to an improved bumper for wheeled vehicles.

Bumpers for trucks and other relatively large wheeled vehicles must be capable of absorbing relatively heavy shock loads due to the relatively large inertia of such vehicles. Therefore, it is desirable to resiliently mount the bumpers of such a vehicle in such a manner that shock due to impact of the vehicle with, for example, a loading dock, is absorbed without excessive shock transmission to the vehicle frame. However, resilient mounting of a bumper capable of absorbing relatively heavy impact loads presents a problem since relatively heavy resilient members, for example, coil springs, etc., occupy considerable space.

This problem is solved by a bumper in accordance with the instant invention which comprises a U-shaped member made from, for example, steel pipe, that is mounted for rotation with respect to a vehicle frame by a torsion bar. The torsion bar is affixed at one end to the vehicle frame and at the other end to the U-shaped member. Movement of the bumper upon impact tends to wind up the torsion bar, thus absorbing the impact without transmitting excessive shock to the vehicle frame.

Many modern heavy-duty vehicles are provided with removable wheel suspensions. Thus, to accommodate movement of a wheel suspension rearwardly of the vehicle, the rear bumper must be retractable to a non-interfering position.

This problem is solved, in accordance with the instant invention, by a novel bumper latch that permits retraction of the bumper, as desired. Yet another feature of the instant invention is the provision of an indicator or control actuator in operative association with a resilient bumper so as to relate a signal or control function to a bias on the bumper.

Accordingly, one object of the instant invention is an improved vehicle bumper.

Another object is an improved resiliently mounted vehicle bumper.

Another object is a latch mechanism that permits retraction of a vehicle bumper.

Another object is a resilient bumper and actuator assembly that relates an indication of control function to a bias on the bumper.

Other objects and advantages of the present invention will be apparent in the following specification, claims and drawings, wherein:

FIGURE 1 is a perspective view of a truck having the improved bumper of the present invention;

FIG. 2 is a cross-sectional view taken substantially along the line 2—2 of FIGURE 1;

FIG. 3 is a cross-sectional view taken substantially along the line 3—3 of FIG. 2;

FIG. 4 is a view similar to FIG. 3, of a modified mounting for the right end of the torsion bar for the retractable bumper;

FIG. 5 is a view taken substantially along the line 5—5 of FIG. 4; and

FIG. 6 is a view taken in the direction of the arrow 6 of FIG. 4.

Referring to FIGURE 1 of the drawings, an improved bumper 10, in accordance with an exemplary constructed embodiment of the instant invention, is shown in operative association with a truck 12. The truck 12 comprises a frame 14 having a cab 16 and a van body 18 mounted thereon. The truck 12 has a conventional front wheel suspension 20 and a rear wheel suspension 22.

As best seen in FIG. 2 of the drawings, the bumper 10 is formed from a tubular member of generally U-shaped configuration defined by a bight portion 30 and upwardly extending leg portions 32 and 34. The bumper 10 is made from, for example, steel pipe having a diameter, as in an exemplary constructed embodiment, of 2½ inches. Upper end portions 36 and 38 of the legs 32 and 34, respectively, are secured to a pair of generally U-shaped shoes 40 and 42, as by welding. The shoes 40 and 42 have upwardly extending leg portions 44–46 and 48–50 which have apertures 52–54 therein and 56–58 therein, respectively. A bearing sleeve 60 extends through the aligned apertures 52 and 54 in the shoe 40 and a similar bearing sleeve 62 extends through the apertures 56 and 58 in the shoe 42 for journaling of a torsion bar 100, as will be discussed.

As best seen in FIG. 2, the frame 14 of the vehicle 12 has a laterally extending beam 70 to which is secured, as by welding, a pair of downwardly depending generally U-shaped bumper support brackets 72 and 74. The U-shaped horizontal cross section of the bracket 72 is defined by leg portions 76 and 78 and a bight portion 80. The U-shaped horizontal cross section of the bracket 74 is defined by leg portions 82 and 84 and a bight portion 86. The leg portions 76–78 and 82–84 of the brackets 72 and 74, respectively, are secured to the laterally extending beam 70, as by welding (FIG. 2).

As best seen in FIG. 3, the leg portions 76 and 78 of the bracket 72 have apertures 90 and 92 therein, respectively, for the acceptance of the bearing sleeve 60. Similarly, the leg portions 82 and 84 of the bracket 74 have apertures 94 and 96 therein, respectively, for the acceptance of the bearing sleeve 62.

The torsion bar 100 extends through the bearing sleeves 60 and 62 to resiliently support the bumper 10 with respect to the beam 70 of the frame 14. One end 102 of the torsion bar 100 is secured to a downwardly depending bracket 104 on the frame 14, as by welding. The other end portion 106 of the torsion bar 100 is secured to the bearing sleeve 60, as by welding. The bearing sleeve 60 is secured to the leg portions 44 and 46 of the shoe 40, as by welding. Similarly, the bearing sleeve 62 is secured to the legs 48 and 50 of the shoe 42, as by welding, the bar 100 being rotatable within the sleeve 62 and the sleeve 62 being rotatable in the apertures 94 and 96 in the bracket 74.

From the foregoing description, it should be apparent that upon movement of the bumper 10 due to, for example, backing of the truck 12 against a loading dock, the end portion 106 of the torsion bar 100 is rotated relative to the fixed end portion 102 thereof, torsionally stressing the torsion bar 100 and absorbing shock between the bumper 10 and frame 14 of the vehicle 12.

It is to be noted that upper end faces 110 and 112 on the shoe 40 and faces 114 and 116 on the shoe 42 are orientated so as to clear a lower inboard corner portion 120 of the beam 70 upon counterclockwise rotation of the bumper 10, FIGURE 2, with respect to the beam 70. Rotation of the bumper 10 counterclockwise about the central axis of the torsion bar 100 is limited by engagement of the leg portions 32 and 34 of the bumper 10 with the bight portions 80 and 86 of the brackets 72 and 74, respectively. Clockwise rotation of the bumper 10 is limited by engagement of the end faces, one of which is shown in FIG. 2, extending generally normal to the faces 110, 112, 114 and 116 on the shoes 40 and 42, respectively.

As best seen in FIG. 2, rotation of the bumper 10 about the axis of the torsion bar 100 may be used to initiate a warning or stopping function. The leg 32 is engageable with an operator 130 of an electropneumatic control 132, thereby to energize the brake actuator 134, a light 136, and a warning bell 138. The brake actuator 134 is energized from a source of air pressure 140 and the light 136 and bell 138 from a battery 142.

Referring to FIG. 4 of the drawings, a bumper 200 in accordance with a modified embodiment of the instant invention, is similar to the bumper 10 disclosed hereinbefore, except for the mode of attachment of the torsion bar 100 to the member 104 of the truck frame 14. The bumper 200 is secured to the frame 14 of the vehicle 12 in a manner that permits retraction of an impact-accepting member 201 thereof from a downwardly depending impact-accepting condition to a generally horizontal position to facilitate removal of, for example, the wheel suspension 22 of the truck 12 rearwardly thereof.

In accordance with the embodiment of FIGS. 4–6, a latch plate 202 is secured to the outer end portion 102 of the torsion bar 100, as by welding. The latch plate 202 has a pair of apertures 204 and 206 therein that are equally spaced from the axis of the torsion bar 100 for the acceptance of a retractable locking pin 208. As seen in FIGS. 4 and 6, the locking pin 208 is engaged in the aperture 206 of the latch plate 202, thereby to secure the impact-accepting member 201 of the bumper assembly 200 in the downwardly depending impact-accepting condition. The locking pin 208 is slidably received in a complementary bore 209 in the frame member 104 and has an outer end portion 210 that is pivotally coupled to a manual operator 212 as by a pin 214. The manual operator 212 is supported for rotation relative to the frame member 104 by a pin 216 that extends through the operator 212 and a support bracket 218. The support bracket 218 is secured to the member 104, as by welding.

The manual operator 212 is normally biased counterclockwise, as seen in FIG. 4 of the drawings, about the pin 216, by a helical tension spring 220 that extends between an aperture 222 in the manual operator 212 and a spring retainer bracket 224 on the frame member 104. Thus, it should be apparent that, to condition the impact-accepting member 201 of the bumper 200 for rotation about the central axis of the torsion bar 100, the manual operator 212 is rotated clockwise, thereby retracting the pin 208 from either the aperture 206 or the aperture 204.

When the locking pin 208 is secured in the aperture 206, as seen in FIGS. 4 and 6, the outer end portion 102 of the torsion bar 100 is secured against rotation relative to the frame member 104, conditioning the torsion bar 100 for torsional deflection upon impact of the impact-accepting member 201 of the bumper 200 with an obstruction. Engagement of the pin 208 in the aperture 204 locks the impact-accepting member 201 of the bumper 200 in the horizontal or retracted condition.

As best seen in FIG. 5 of the drawings, the transverse beam 70 of the frame 14 is provided with a pair of scallops or cutouts 230, one of which is shown, for the acceptance of the leg portions 32 and 34 of the impact-accepting member 201 when it is rotated to the retracted condition.

From the foregoing description, it should be apparent that the bumper of the instant invention is capable of absorbing relatively heavy impacts by torsional loading of the torsion bar 100, thereby precluding excessive shock transmitted to the vehicle frame. Deflection of the impact-accepting member of the bumper is transmitted to an actuator for energization of a signal or control circuit, as desired. A relatively simple latch and pin mechanism on the outer end of the torsion bar facilitates retraction of the impact-accepting member of the bumper assembly to permit rearward movement, of for example, a wheel suspension.

It is to be understood that the specific constructions of the improved bumper herein disclosed and described are presented for the purpose of explanation and illustration and are not intended to indicate limits of the invention, the scope of which is defined by the following claims.

What is claimed is:

1. In an over-the-road vehicle having a frame, a resiliently mounted bumper comprising a downwardly depending upwardly opening impact-accepting member of generally U-shaped configuration defined by spaced leg portions and an intermediate bight portion, the leg portions of said impact member having aligned bearings at the ends opposite the bight portion thereof, the vehicle frame having spaced bearings axially aligned with one another and with the bearings on the ends of said impact member and a torsion bar rotatable about its longitudinal axis for resiliently supporting said bumper for deflection relative to the frame of the vehicle, said torsion bar extending through said leg and frame bearings and having one portion affixed to one of the leg portions of said impact-accepting member and another portion affixed to the vehicle frame.

2. In an over-the-road vehicle having a frame, a resiliently mounted retractable bumper comprising an impact-accepting member, a torsion bar supported for rotation by the vehicle frame, said torsion bar being rotatable about a longitudinal axis thereof to resiliently support said bumper for deflection relative to the frame of the vehicle, said torsion bar having one portion affixed to one portion of said impact-accepting member, a bearing on another portion of said member, said torsion bar extending through said bearing, and means on another portion of said torsion bar releasably engageable with the vehicle frame to latch said bumper in position for deflection relative to the vehicle frame and to latch said bumper in a retracted position selectively.

References Cited by the Examiner

UNITED STATES PATENTS

| | | | |
|---|---|---|---|
| 269,633 | 12/82 | Budd | 267—57 |
| 659,078 | 10/00 | Lieb | 293—4 X |
| 986,800 | 8/10 | Randerson | 293—100 X |
| 1,043,316 | 11/12 | Hanna et al. | 293—86 |
| 1,094,564 | 4/14 | Henderson | 293—4 |
| 1,136,998 | 4/15 | Bond | 293—100 X |
| 1,160,247 | 11/15 | Bond | 293—100 X |
| 1,471,382 | 10/23 | Cavanaugh | 293—73 X |
| 1,528,617 | 3/25 | Klotz | 293—86 |
| 1,531,508 | 3/25 | Roth | 293—84 |
| 1,579,928 | 4/26 | Groesbeck | 293—84 X |
| 1,581,041 | 4/26 | DeBarrios | 293—73 X |
| 1,921,653 | 8/33 | Boyer | 293—74 |
| 2,417,849 | 3/47 | Walters et al. | 114—220 |
| 2,438,432 | 3/48 | Edwards | 267—57 |
| 2,553,320 | 5/51 | Huff | 293—84 X |
| 2,588,815 | 3/52 | Fasolino | 293—4 X |
| 2,677,936 | 5/54 | Hewitt | 61—48 |
| 3,068,039 | 12/62 | Barenyi | 293—86 X |
| 3,145,685 | 8/64 | Kulick | 293—84 X |

FOREIGN PATENTS

| | | |
|---|---|---|
| 590,986 | 3/25 | France. |
| 879,255 | 10/61 | Great Britain. |

MILTON BUCHLER, *Primary Examiner.*

JAMES S. SHANK, LEO QUACKENBUSH, *Examiners.*